(12) United States Patent
Jeong et al.

(10) Patent No.: US 11,932,140 B2
(45) Date of Patent: Mar. 19, 2024

(54) SEAT FOR VEHICLE

(71) Applicants: Hyundai Motor Company, Seoul (KR); Kia Corporation, Seoul (KR); Hyundai Transys Inc., Seosan-Si (KR)

(72) Inventors: Dong Woo Jeong, Gyeonggi-do (KR); Eun Sue Kim, Gyeonggi-do (KR); Dae Hee Lee, Incheon (KR); Myung Hoe Kim, Seoul (KR); Jun Sik Hwang, Gyeonggi-do (KR); Gwon Hwa Bok, Gyeonggi-do (KR); Hae Dong Kwak, Gyeonggi-do (KR); Jae Sung Shin, Gyeonggi-do (KR); Han Kyung Park, Gyeonggi-do (KR); Jae Hoon Cho, Gyeonggi-do (KR)

(73) Assignees: Hyundai Motor Company, Seoul (KR); Kia Corporation, Seoul (KR); Hyundai Transys Inc., Chungcheongnam-do (KR)

( * ) Notice: Subject to any disclaimer, the term of this patent is extended or adjusted under 35 U.S.C. 154(b) by 0 days.

(21) Appl. No.: 17/812,399

(22) Filed: Jul. 13, 2022

(65) Prior Publication Data

US 2023/0191962 A1    Jun. 22, 2023

(30) Foreign Application Priority Data

Dec. 16, 2021 (KR) .......... 10-2021-0180803

(51) Int. Cl.
*B60N 2/30* (2006.01)

(52) U.S. Cl.
CPC ......... *B60N 2/3047* (2013.01); *B60N 2/3056* (2013.01)

(58) Field of Classification Search
CPC .. B60N 2/3047; B60N 2/3056; B60N 2/3045; B60N 2/30; B60N 2/3002; B60N 2/3038; B60N 2/304; B60N 2/3059
USPC ..................................... 297/354.12
See application file for complete search history.

(56) References Cited

U.S. PATENT DOCUMENTS

| | | | | |
|---|---|---|---|---|
| 10,479,508 B2* | 11/2019 | Joffre | .............. | B64D 11/0691 |
| 2014/0319275 A1* | 10/2014 | Najd | .............. | B60N 2/3018 |
| | | | | 297/14 |
| 2016/0144748 A1* | 5/2016 | Akutsu | .............. | B60N 2/3013 |
| | | | | 297/341 |
| 2021/0061144 A1* | 3/2021 | Madhu | .............. | B60N 2/3047 |

FOREIGN PATENT DOCUMENTS

KR   10-2008-0054526 A   6/2008

* cited by examiner

*Primary Examiner* — Mark R Wendell
(74) *Attorney, Agent, or Firm* — Fox Rothschild LLP

(57) ABSTRACT

Disclosed is a cushion tip-up type seat for a vehicle. The cushion tip-up type seat for a vehicle is configured to perform a tip-up function of a cushion part, and to move a seat leftward and rightward to adjust an interval between left and right seats, whereby left and right spacing between occupants seated in the seats is sufficiently secured and the convenience of the occupants is improved.

11 Claims, 7 Drawing Sheets

SEAT FOR VEHICLE

CROSS REFERENCE TO RELATED APPLICATION

The present application is based on claims the benefit of Korean Patent Application No. 10-2021-0180803, filed Dec. 16, 2021, the entire contents of which is incorporated herein for all purposes by this reference.

TECHNICAL FIELD

Embodiments of the present disclosure relate generally to a cushion tip-up type seat for a vehicle and, more particularly, to a cushion tip-up type seat for a vehicle, wherein the seat with a tip-up type cushion part is configured to be moved leftward and rightward so that left and right spacing between occupants is sufficiently secured.

DESCRIPTION OF THE RELATED ART

A vehicle is equipped with a seat on which an occupant sits. Generally, the vehicle seat includes a cushion part supporting the lower body of the occupant and a seatback part supporting the upper body of the occupant.

In order to board as many occupants as possible in the limited space of a vehicle, a technology has been proposed that adopts a seat in which the cushion part is tipped up.

The seat with the tip-up type cushion part has the concept of an auxiliary seat. When an occupant uses the seat, the occupant unfolds the cushion part perpendicularly to the seatback part for use, and when the seat is not used, the occupant folds the cushion part upward so that the cushion part is brought into close contact with the seatback part for storing.

However, the conventional seat with the tip-up type cushion part is configured such that the cushion part is simply tipped up. When seats are arranged transversally, left and right spacing between occupants is not sufficiently secured and the occupants feel discomfort.

SUMMARY

Embodiments of the present disclosure are intended to provide a cushion tip-up type seat for a vehicle with a tip-up type cushion part, wherein the seat is configured to be moved leftward and rightward to sufficiently secure left and right spacing between occupants to improve the convenience of the occupants.

In order to achieve the above objective, according to one embodiment of the present disclosure, there is provided a cushion tip-up type seat for a vehicle, the cushion tip-up type seat including: a cushion part and a seatback part, wherein the cushion part may be configured to perform a tip-up movement such that the cushion part may be rotatably unfolded or be folded upward with respect to the seatback part; and the seatback part and the cushion part may be configured to be movable transversally with respect to a vehicle body as a connecting device connecting the seatback part to the vehicle body may be operated.

The cushion tip-up type seat may include: a locking device provided at both the seatback part and the vehicle body and configured to restrict movement of the seatback part by mutual coupling thereof.

The connecting device may include: a vehicle body mounting bracket coupled to the vehicle body; and a connection link connecting the seatback part to the vehicle body mounting bracket and including a plurality of separate parts to which a connection part is rotatably coupled.

The vehicle body mounting bracket may be securely coupled to the vehicle body located in rear of the seatback part.

The connection link may include: a first fixation link coupled to a back frame constituting the seatback part; a second fixation link coupled to the vehicle body mounting bracket; and a rotary link arranged to be transversally extended between the first fixation link and the second fixation link, and of which opposite ends may be rotatably coupled to the first fixation link and the second fixation link, respectively.

A transversal movement distance of the seatback part may be determined by a distance between a coupling point of the first fixation link and the rotary link and a coupling point of the second fixation link and the rotary link.

The coupled body of the vehicle body mounting bracket and the connection link may include two coupled bodies and the two coupling bodies may be arranged to be transversally spaced apart from each other.

The vehicle body mounting bracket and the connection link may be arranged such that two connection links may be vertically provided for one vehicle body mounting bracket.

The locking device may include: a latch coupled to a back frame constituting the seatback part; a striker coupled to the vehicle body to face the latch; and a latch operation lever provided at the seatback part and connected to the latch by a wire.

The tip-up movement of the cushion part may be performed by a gas spring connecting the cushion part to the seatback part.

According to the embodiment of the present disclosure, in the cushion tip-up type seat for a vehicle with the tip-up type cushion part, an interval between left and right seats may be adjusted by leftward and rightward movement of the seat. Therefore, sufficient securing of left and right spacing between occupants in the seats is possible so that the convenience of the occupants may be improved.

As discussed, the method and apparatus suitably include use of a controller or processor.

In another embodiment, vehicles are provided that comprise an apparatus as disclosed herein.

BRIEF DESCRIPTION OF THE DRAWINGS

The above and other objectives, features, and other advantages of the embodiments of present disclosure will be more clearly understood from the following detailed description when taken in conjunction with the accompanying drawings, in which.

DETAILED DESCRIPTION

Figure 1:
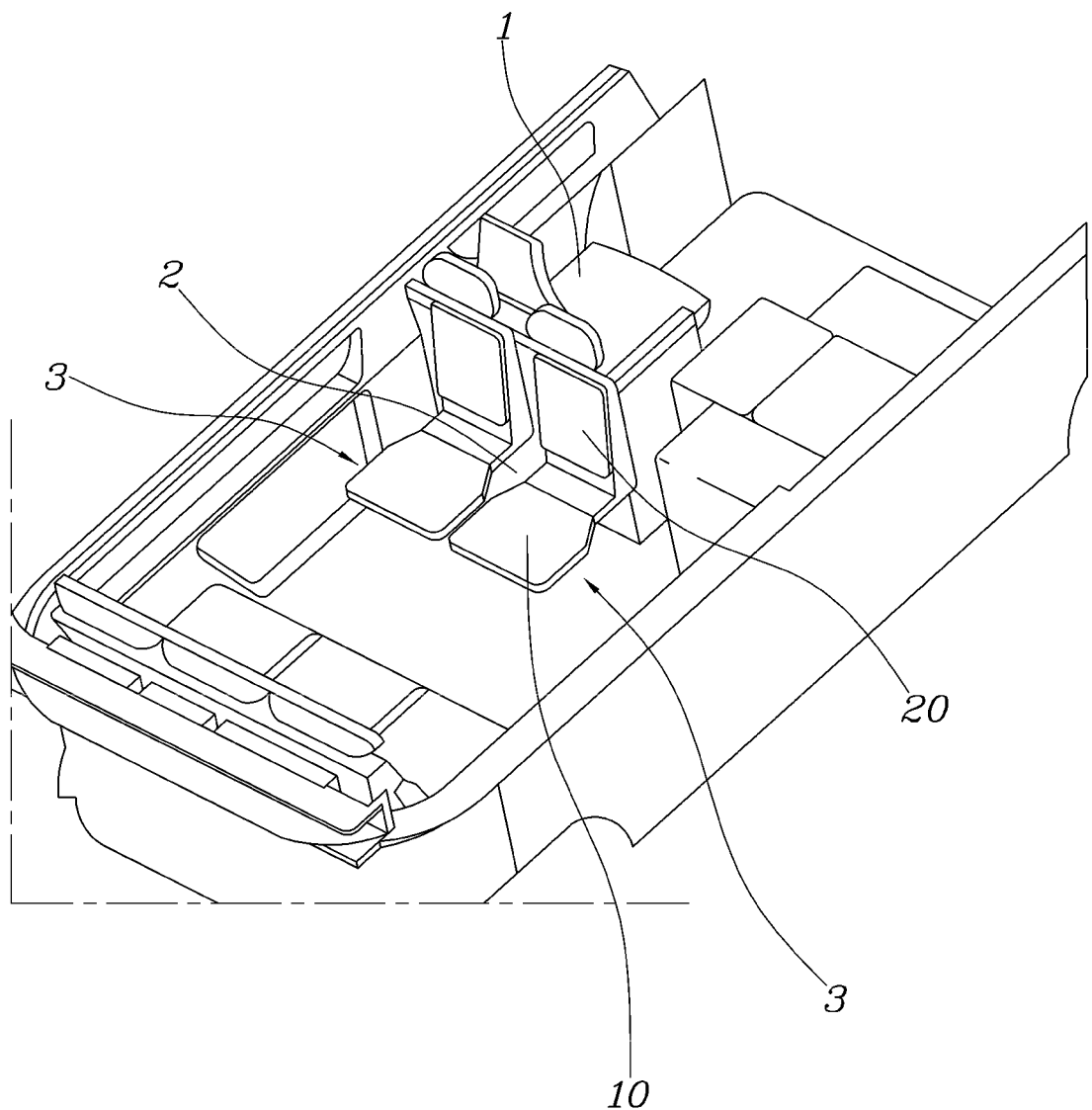
FIG. 1 is a view showing a vehicle equipped with a cushion tip-up type seat according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In the following description, the structural or functional description specified to exemplary embodiments according to the concept of the present disclosure is intended to describe the exemplary embodiments, so it should be understood that the present disclosure may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the present disclosure are not limited to the embodiments which will be described hereinbelow with reference to the accompanying drawings, but all of modifications, equivalents, and substitutions are included in the scope and spirit of the disclosure.

It will be understood that, although the terms first and/or second, etc. may be used herein to describe various elements, these elements should not be limited by these terms. These terms are only used to distinguish one element from another element. For instance, a first element discussed below could be termed a second element without departing from the teachings of embodiments of the present disclosure. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent", or "directly adjacent" should be interpreted in the same manner as those described above.

The terminology used herein is for the purpose of describing particular embodiments only and is not intended to limit the present disclosure. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present disclosure belongs. It must be understood that the terms defined by the dictionary are identical with the meanings within the context of the related art, and they should not be ideally or excessively formally defined unless the context clearly dictates otherwise The controller CR according to the embodiment of the present disclosure may be implemented by a nonvolatile memory (not shown), which consists of an algorithm configured to control operations of various components of a vehicle or data regarding software instructions to play the algorithm, and a processor (not shown), which is configured to perform operations described below using the data stored in the memory. The memory and processor may be implemented as separate chips. Alternatively, the memory and processor may be implemented as single chips integrated with each other. The processor may take the form of one or more processors.

Hereinbelow, a cushion tip-up type seat for a vehicle according to an exemplary embodiment of the present disclosure will be described with reference to accompanying drawings.

As shown in FIG. 1, on a vehicle body 2 mounted to separate a driver seat 1 from a back space of the driver seat 1, a cushion tip-up type seat 3 according to embodiments of the present disclosure may be mounted to be transversally arranged in a rear facing direction.

In the embodiment according to the present disclosure, two cushion tip-up type seats 3 may be mounted to the vehicle body 2 left and right, and when necessary, three cushion tip-up type seats 3 may be mounted.

Figure 2:
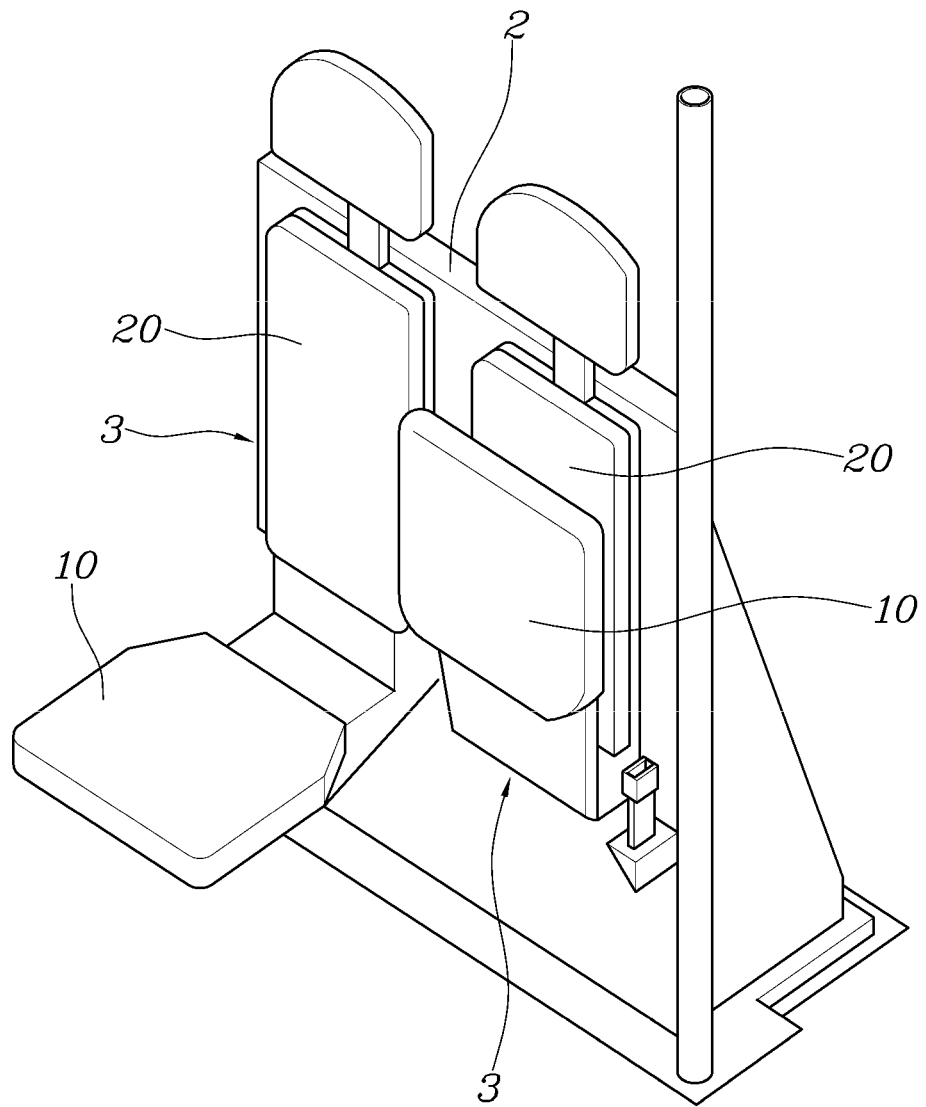
FIG. 2 is a view showing a cushion part tipped up according to an exemplary embodiment of the present disclosure.

As shown in FIG. 2, the cushion tip-up type seat 3 according to embodiments of the present disclosure may include a cushion part 10 supporting the lower body of an occupant and a seatback part 20 supporting the upper body of the occupant. The cushion part 10 may perform a tip-up movement such that the cushion part 10 is rotatably unfolded and folded upward with respect to the seatback part 20.

When the cushion part 10 is unfolded by being rotated at a right angle with respect to the seatback part 20, the occupant may seat on the cushion part 10. When the cushion part 10 is rotated upward and tipped up to be brought into close contact with the seatback part 20, the seat may be efficiently stored between uses, and thus the vehicle indoor space is widened to be used for another purpose.

Figure 3A:
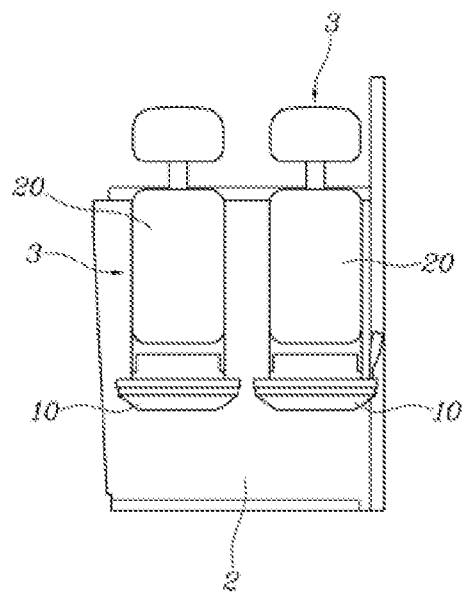
FIG. 3A is a view showing a cushion tip-up type seat according to an exemplary embodiment of the present disclosure and a state where an interval between left and right seats is narrowed.
Figure 3B:
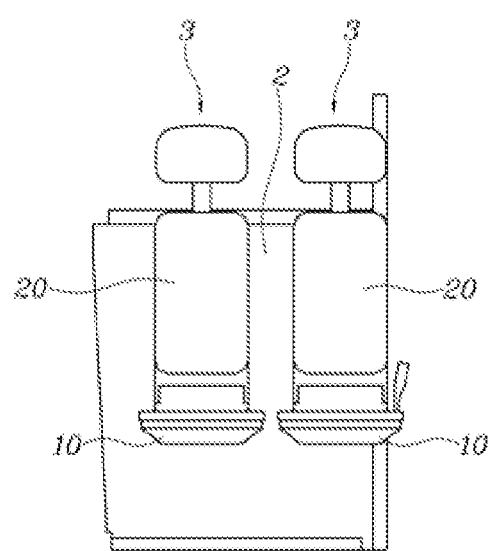
FIG. 3B is a view showing a cushion tip-up type seat according to an exemplary embodiment of the present disclosure and a state where the right seat is moved rightward so that an interval between the left and right seats is widened.
Figure 4:
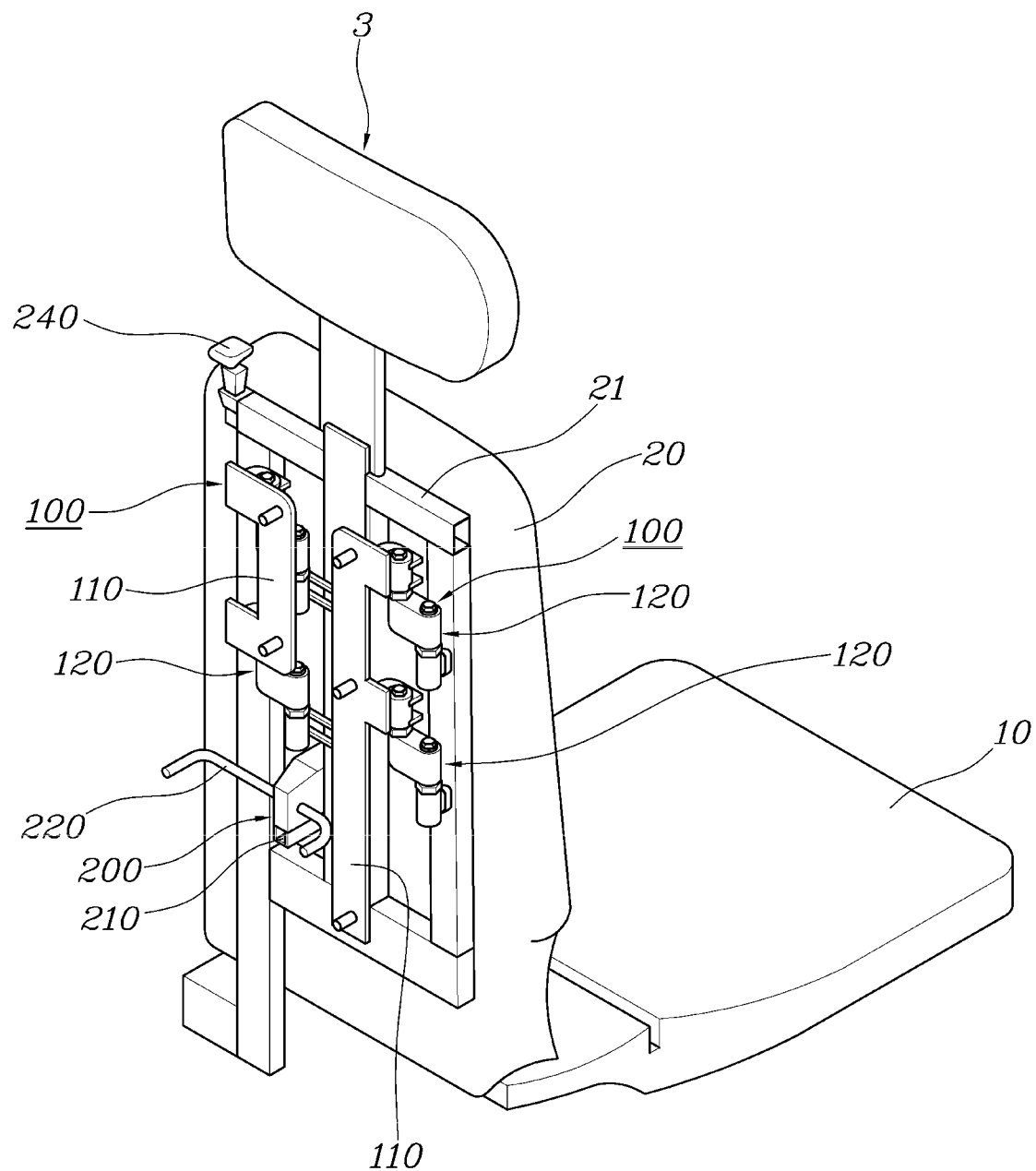
FIG. 4 is a view showing a connecting device and a locking device included in the cushion tip-up type seat according to an exemplary embodiment of the present disclosure.

Furthermore, as shown in FIG. 3A, the seat according to the embodiment of the present disclosure may be used as an interval between the seats 3 is reduced, and when necessary, as shown in FIG. 3B, the seat may be used as the left and right interval between the seats 3 is widened. When the seats are used as the interval between the seats 3 are widened, left to right spacing between the occupants may be sufficiently secured and the convenience of the occupants may be improved.

In order to adjust an interval between the left and right seats 3, the seatback part 20 of the seat 3 and the vehicle body 2 may be connected to each other by a connecting device 100 according to embodiments of the present disclosure, as shown in FIGS. 4 to 7. By operation of the connecting device 100, the seatback part 20 and the cushion part 10 may be transversally movable with respect to the vehicle body 2.

According to embodiments of the present disclosure, the connecting device 100 includes: a vehicle body mounting bracket 110 coupled to the vehicle body 2; and a connection link 120 connecting the seatback part 20 to the vehicle body mounting bracket 110 and including a plurality of separate parts to which a connection part is rotatably coupled.

The vehicle body mounting bracket 110 may be securely coupled to the vehicle body 2 that is located at rear of the seatback part 20 to face the seatback part 20.

The connection link 120 may include: a first fixation link 121 securely coupled to a back frame 21 constituting the seatback part 20; a second fixation link 122 securely coupled to the vehicle body mounting bracket 110; and a rotary link 123 arranged to be transversally extended between the first fixation link 121 and the second fixation link 122, and of which opposite ends are rotatably coupled to the first fixation link 121 and the second fixation link 122, respectively.

As shown in the drawings, the first fixation link 121 may be coupled to the lowest end of the connection link 120, and a first end of the rotary link 123 may be rotatably coupled to an upper end of the first fixation link 121. A lower end of the second fixation link 122 may be rotatably coupled to a second end of the rotary link 123, and an upper end of the second fixation link 122 may be coupled to the vehicle body mounting bracket 110.

Herein, a transversal movement distance of the seatback part 20 including the cushion part 10 may be determined by a length L1 between a coupling point of the first fixation link 121 and the rotary link 123 and a coupling point of the second fixation link 122 and the rotary link 123. As the length L1 increases, the transversal movement distance of the seatback part 20 including the cushion part 10 may increase.

Meanwhile, the coupled body of the vehicle body mounting bracket 110 and the connection link 120, i.e., the connecting device 100 according to embodiments of the present disclosure may include two coupled bodies, and the two coupled bodies are arranged to be spaced apart from each other transversally with respect to the seatback part 20. Accordingly, the strength and stiffness of the connection structure between the vehicle body 2 and the seatback part 20 as a medium of the connecting device 100 may be improved, so that the transversal movement of the seat 3 may be stably performed.

Furthermore, the vehicle body mounting bracket 110 may be configured such that two connection links 120 are vertically arranged for each vehicle body mounting bracket 110. Therefore, the strength and stiffness of the connection structure between the vehicle body mounting bracket 110 and the back frame 21 may be reinforced.

The cushion tip-up type seat according to the embodiment of the present disclosure may include a locking device 200 provided at both the seatback part 20 and the vehicle body 2 and restricting the transversal movement of the seatback part 20 or releasing the restriction by mutual coupling thereof.

The locking device 200 may include: a latch 210 coupled to the back frame 21 constituting the seatback part 20; a striker 220 coupled to the vehicle body 2 to face the latch 210; and a latch operation lever 240 provided at the seatback part 20 and connected to the latch 210 by a wire 230.

The latch operation lever 240 may be provided to protrude from an upper end of the seatback part 20. When the occupant pulls the latch operation lever 240, a manipulation force of the user may be transmitted to the latch 210 via the wire 230 to allow the latch 210 into an unlocking state, and the latch 210 and the striker 220 are brought into a mutually-separable unlocked state. When the latch operation lever 240 pulled by the occupant is released, the latch 210 may be turned again into a locking state, and the latch 210 and the striker 220 may be brought into a locked state in which the latch 210 and the striker 220 are engaged with each other.

The striker 220 may be installed to be transversally extended, and a transversally extended length may be set to sufficiently cover a transversal movement range of the latch 210 in response to the transversal movement of the seatback part 20.

Figure 5:
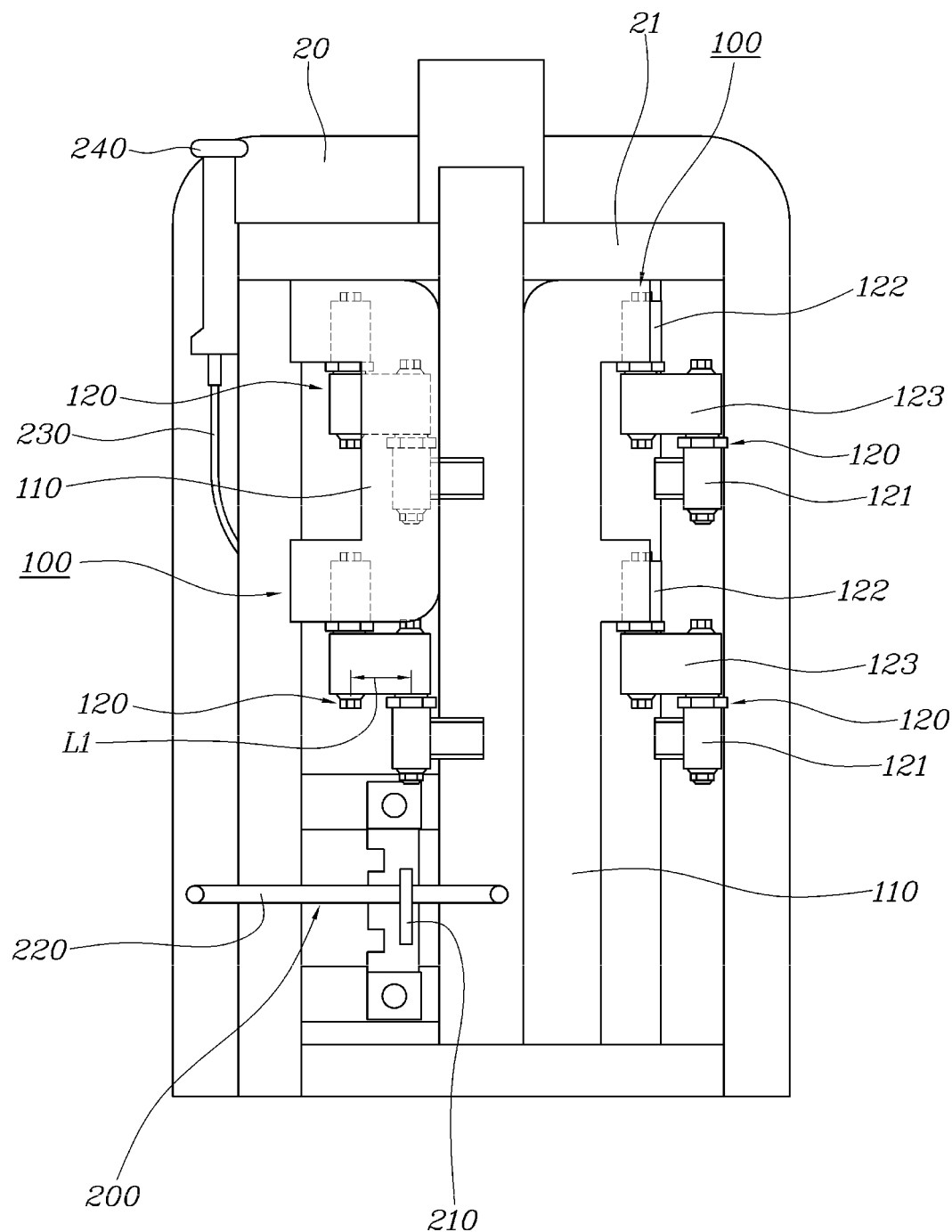
FIG. 5 is a front view showing a seatback part in FIG. 4, wherein the view shows a state before the seat is rotated transversally.

FIG. 3A is a view showing a state where an interval between the left and right seats is narrowed. FIG. 5 is a view showing the connecting device 100 and the locking device 200 in FIG. 3A.

Figure 6:
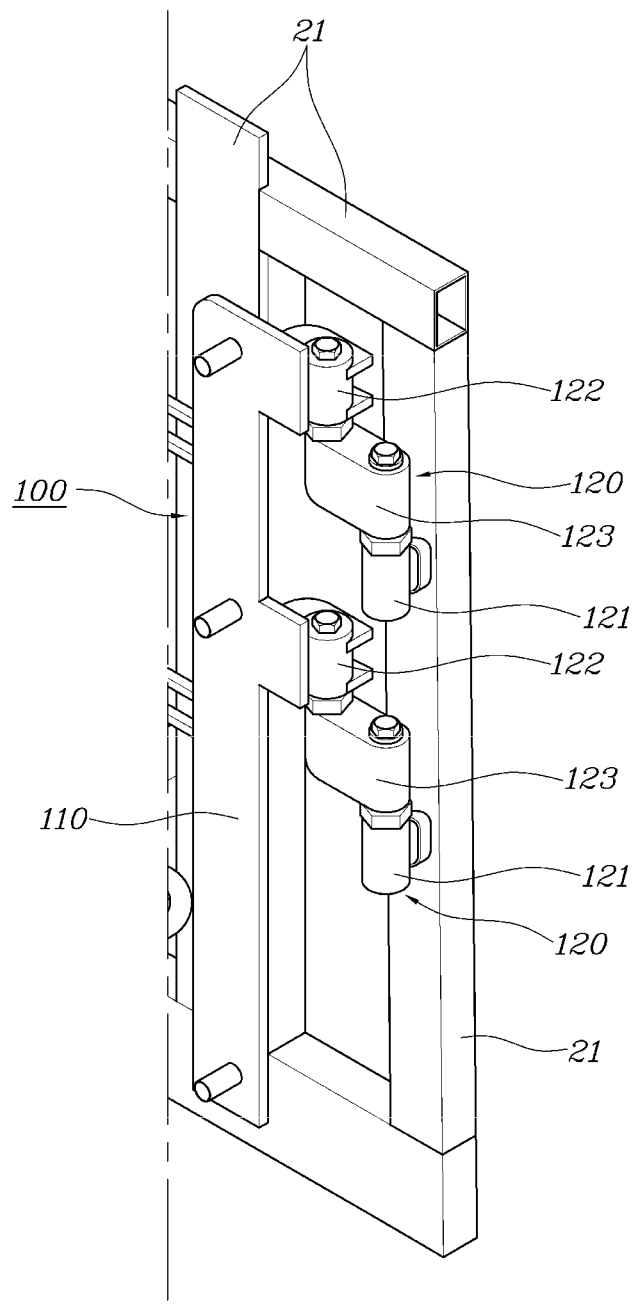
FIG. 6 is a view showing a connection link in FIG. 5.

In a state shown in FIG. 5, the user pulls the latch operation lever 240 to release the latch 210 and the striker 220 from the locking state and then pushes the seatback part 20 leftward, the seatback part 20 may be moved leftward by rotation of the rotary link 123 and the latch 210 may be moved and the seat enters a state in FIG. 3B and FIG. 6.

Figure 7:
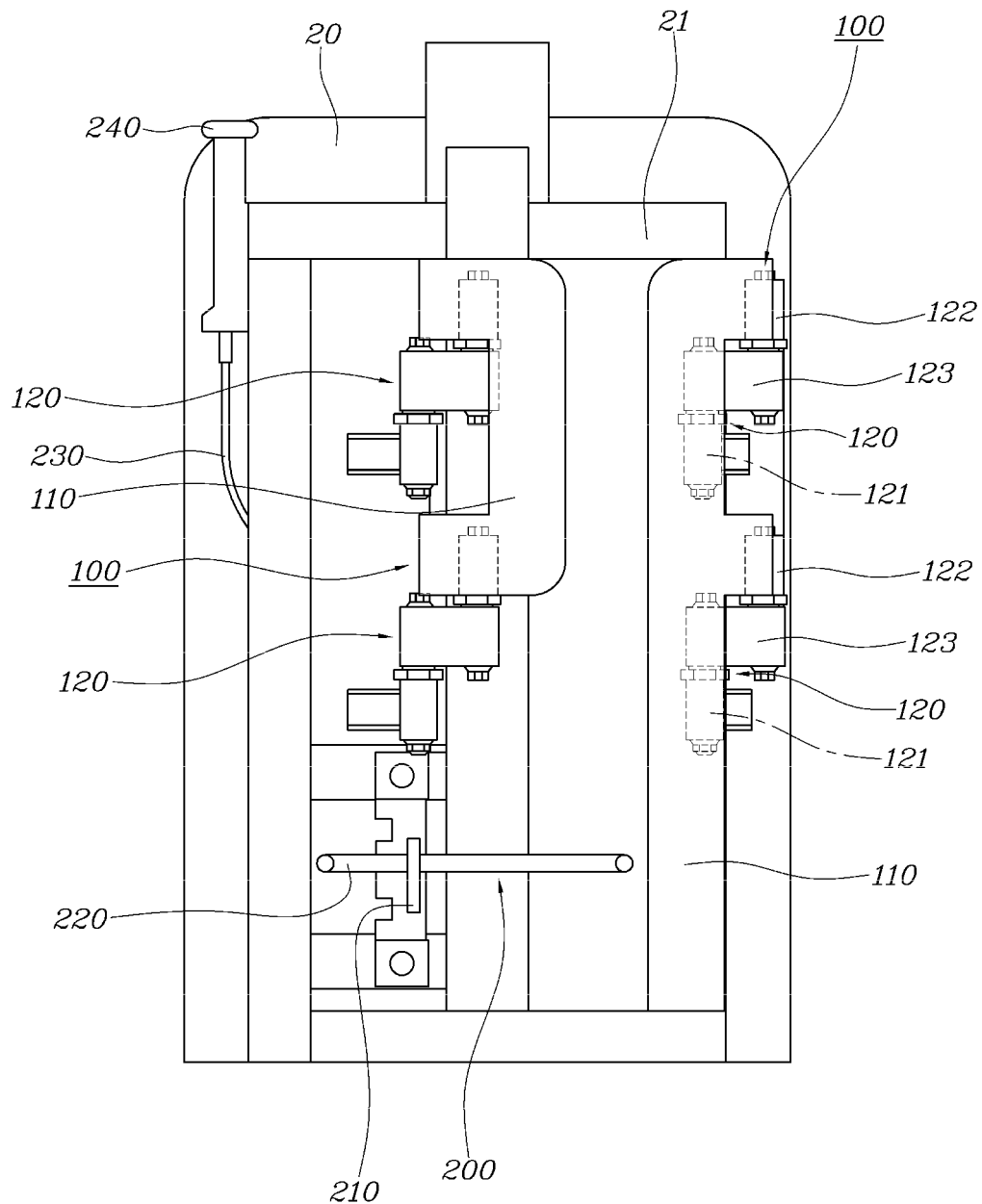
FIG. 7 is a view showing a state after the seat in FIG. 5 is rotated transversally.

FIG. 3B is a view showing the state where the right seat is moved rightward so that an interval between the left and right seats is widened. FIG. 7 is a view showing the connecting device 100 and the locking device 200 in the state of FIG. 3B.

In the state where the seat 3 is moved and the interval between the left and right seats is widened, the location of the seat 3 may be locked again by locking between the latch 210 and the striker 220.

When the interval between the seats 3 are narrowed again, the above-described operation is performed in reverse order.

As described above, according to the embodiment of the present disclosure, in the cushion tip-up type seat 3 for a vehicle with the tip-up cushion part 10, an interval between the left and right seats 3 may be adjusted by transversal movement of the seat 3, whereby left and right spacing between the occupants in the seats 3 may be sufficiently secured and the convenience of the occupant may be improved.

Although the preferred embodiments of the present disclosure have been disclosed for illustrative purposes, those skilled in the art will appreciate that various modifications, additions, and substitutions are possible, without departing from the spirit and scope of embodiments of the present disclosure.

What is claimed is:

1. A seat for a vehicle, the seat comprising:
    a cushion part; and
    a seatback part,
    wherein the seatback part and the cushion part are configured to be movable transversally with respect to a vehicle body as a plurality of connecting devices connecting the seatback part to the vehicle body are operated;
    wherein each of the connecting devices comprises a connection link comprising a plurality of separate parts to which a connection part is rotatably coupled; and
    wherein the plurality of connecting devices are arranged to be transversely spaced apart from each other.

2. The seat of claim 1, further comprising a locking device provided at both the seatback part and the vehicle body and configured to restrict movement of the seatback part by mutual coupling thereof.

3. The seat of claim 2, wherein the locking device comprises:
    a latch coupled to a back frame constituting the seatback part;
    a striker coupled to the vehicle body to face the latch; and
    a latch operation lever provided at the seatback part and connected to the latch by a wire.

4. The seat of claim 1, wherein each of the connecting devices further comprises a vehicle body mounting bracket coupled to the vehicle body, wherein the connection link connects the seatback part to the vehicle body mounting bracket.

5. The seat of claim 4, wherein the vehicle body mounting bracket is securely coupled to the vehicle body located in rear of the seatback part.

6. The seat of claim 4, wherein the coupled body of the vehicle body mounting bracket and the connection link comprises two coupled bodies and the two coupling bodies are arranged to be transversally spaced apart from each other.

7. The seat of claim 4, wherein the vehicle body mounting bracket and the connection link are arranged such that two connection links are vertically provided for one vehicle body mounting bracket.

8. The seat of claim 1, wherein the connection link further comprises:
    a first fixation link coupled to a back frame constituting the seatback part;
    a second fixation link coupled to the vehicle body mounting bracket; and
    a rotary link arranged to be transversally extended between the first fixation link and the second fixation link, and of which opposite ends are rotatably coupled to the first fixation link and the second fixation link, respectively.

9. The seat of claim 8, wherein a transversal movement distance of the seatback part is determined by a distance between a coupling point of the first fixation link and the rotary link and a coupling point of the second fixation link and the rotary link.

10. The seat of claim 1,
    wherein the cushion part is configured to perform a tip-up movement such that the cushion part is able to be rotatably folder or folded upward with respect to the seatback part; and
    wherein the tip-up movement of the cushion part is performed by a gas spring connecting the cushion part to the seatback part.

11. A vehicle comprising the seat of claim 1.

* * * * *